United States Patent
Miao et al.

(10) Patent No.: US 12,503,589 B2
(45) Date of Patent: Dec. 23, 2025

(54) RESIN FILM, AND BAG, GLOVE, AND BANDING MATERIAL FORMED FROM THE RESIN FILM

(71) Applicant: KANEKA CORPORATION, Osaka (JP)

(72) Inventors: Wei Miao, Settsu (JP); Takeshi Sugiyama, Settsu (JP)

(73) Assignee: KANEKA CORPORATION, Osaka (JP)

( * ) Notice: Subject to any disclaimer, the term of this patent is extended or adjusted under 35 U.S.C. 154(b) by 393 days.

(21) Appl. No.: 18/042,027

(22) PCT Filed: Aug. 12, 2021

(86) PCT No.: PCT/JP2021/029763
§ 371 (c)(1),
(2) Date: Feb. 17, 2023

(87) PCT Pub. No.: WO2022/044836
PCT Pub. Date: Mar. 3, 2022

(65) Prior Publication Data
US 2023/0303828 A1   Sep. 28, 2023

(30) Foreign Application Priority Data
Aug. 25, 2020 (JP) .................. 2020-141510

(51) Int. Cl.
*C08L 67/04* (2006.01)
*C08J 5/18* (2006.01)
*C08K 5/14* (2006.01)

(52) U.S. Cl.
CPC ........... *C08L 67/04* (2013.01); *C08J 5/18* (2013.01); *C08K 5/14* (2013.01); *C08J 2367/04* (2013.01); *C08J 2467/04* (2013.01); *C08L 2205/025* (2013.01); *C08L 2205/03* (2013.01); *Y10T 428/1352* (2015.01)

(58) Field of Classification Search
CPC .............. C08L 67/04; C08L 2205/025; C08L 2205/03; C08K 5/14

USPC .............................................. 428/34.1–36.92
See application file for complete search history.

(56) References Cited

U.S. PATENT DOCUMENTS

| | | | |
|---|---|---|---|
| 2011/0124779 A1* | 5/2011 | Whitehouse | C08J 3/226 524/404 |
| 2015/0147929 A1* | 5/2015 | Krishnaswamy | C08J 5/18 525/445 |
| 2017/0198136 A1* | 7/2017 | Minami | B29B 9/12 |
| 2020/0095420 A1* | 3/2020 | Johnson | B29C 48/022 |
| 2020/0181397 A1 | 6/2020 | Koyama et al. | |
| 2020/0354539 A1 | 11/2020 | Minami | |

FOREIGN PATENT DOCUMENTS

| | | | |
|---|---|---|---|
| WO | WO 2010/151798 A2 | 12/2010 | |
| WO | WO 2015/146194 A1 | 10/2015 | |
| WO | WO-2019022008 A1 * | 1/2019 | ......... B29C 49/0005 |
| WO | WO 2019/146555 A1 | 8/2019 | |

OTHER PUBLICATIONS

International Search Report issued Sep. 28, 2021 in PCT/JP2021/029763, filed on Aug. 12, 2021, citing documents 1-2 & 15-16 therein, 2 pages.

* cited by examiner

*Primary Examiner* — Michael C Romanowski
(74) *Attorney, Agent, or Firm* — Oblon, McClelland, Maier & Neustadt, L.L.P.

(57) ABSTRACT

Provided is a resin film containing a reaction product of 100 parts by weight of a poly(3-hydroxyalkanoate) resin component and 0.01 to 0.5 parts by weight of an organic peroxide. The poly(3-hydroxyalkanoate) resin component includes: a copolymer (A) which is a copolymer of 3-hydroxybutyrate units and 3-hydroxyhexanoate units and in which a content of the 3-hydroxyhexanoate units is from 1 to 6 mol %; and a copolymer (B) which is a copolymer of 3-hydroxybutyrate units and 3-hydroxyhexanoate units and in which a content of the 3-hydroxyhexanoate units is 24 mol % or more.

18 Claims, No Drawings

RESIN FILM, AND BAG, GLOVE, AND BANDING MATERIAL FORMED FROM THE RESIN FILM

CROSS-REFERENCE TO RELATED APPLICATIONS

The present application is a 35 U.S.C. § 371 national stage application of International patent application PCT/JP2021/029763 filed on Aug. 12, 2021, which is based on and claims the benefits of priority to Japanese Application No. 2020-141510 filed on Aug. 25, 2020. The entire contents of these applications are incorporated herein by reference.

TECHNICAL FIELD

The present invention relates to a resin film containing a poly(3-hydroxyalkanoate) resin component and to a bag, glove, and banding material formed from the resin film.

BACKGROUND ART

A huge amount of petroleum-based plastics are discarded as waste every year. The huge amount of waste plastics have caused environmental pollution, which has become a serious concern. Additionally, in recent years, microplastics have caused significant harm to the marine environment.

Poly(3-hydroxyalkanoate) resins are highly degradable in seawater and can be a solution to the environmental problems induced by plastics discarded as waste. For example, poly(3-hydroxybutyrate-co-3-hydroxyhexanoate) is one of the poly(3-hydroxyalkanoate) resins, and the mechanical properties of this resin can be flexibly controlled by changing the proportion of 3-hydroxyhexanoate.

However, increasing the proportion of 3-hydroxyhexanoate tends to cause a reduction in molded article productivity although the increased proportion of 3-hydroxyhexanoate leads to a decrease in crystallinity and hence an improvement in mechanical properties of the resulting molded article. To achieve mechanical properties required of a molded article such as a film, the proportion of 3-hydroxyhexanoate needs to be increased to such a degree that industrial production of the article becomes extremely difficult. This makes it hard to obtain a molded article that is satisfactory in both productivity and mechanical properties by using a poly(3-hydroxyalkanoate) resin.

Patent Literature 1 describes a polyester resin composition containing two polyhydroxyalkanoates in order to improve the solidification characteristics and increase the processing rate in melt molding, and mentions a film and a sheet as examples of molded articles of the polyester resin composition.

Patent Literature 2 describes a resin composition for inflation molding, and this resin composition is obtained by melting and kneading a poly(3-hydroxyalkanoate), an organic peroxide, and an ester compound together.

CITATION LIST

Patent Literature

PTL 1: WO 2015/146194
PTL 2: WO 2019/022008

SUMMARY OF INVENTION

Technical Problem

With the use of the polyester resin composition described in Patent Literature 1, a resin film can be produced with high productivity. However, the resin film lacks sufficient strength, and it is difficult to ensure both resin film strength and resin film productivity. Additionally, the resin film has low blocking resistance. For example, when the resin film is processed into a bag, the bag has poor openability.

The use of the resin composition described in Patent Literature 2 cannot achieve sufficient resin film productivity, and improvement in this regard is desired. It is also desired to increase the strength and blocking resistance of the resulting film.

In view of the above circumstances, the present invention aims to provide a resin film containing a poly(3-hydroxyalkanoate) resin component, the resin film having good mechanical properties and high blocking resistance and being producible with high productivity.

Solution to Problem

As a result of intensive studies with the goal of solving the above problem, the present inventors have found that when a resin film is made of a reaction product obtained by using two poly(3-hydroxybutyrate) resins differing in the contents of constituent monomers and modifying these resins with an organic peroxide, the resin film has good mechanical properties and high blocking resistance and can be produced with high productivity. Based on this finding, the inventors have completed the present invention.

Specifically, the present invention relates to a resin film containing a reaction product of 100 parts by weight of a poly(3-hydroxyalkanoate) resin component and 0.01 to 0.5 parts by weight of an organic peroxide, wherein the poly(3-hydroxyalkanoate) resin component includes: a copolymer (A) which is a copolymer of 3-hydroxybutyrate units and 3-hydroxyhexanoate units and in which a content of the 3-hydroxyhexanoate units is from 1 to 6 mol %; and a copolymer (B) which is a copolymer of 3-hydroxybutyrate units and 3-hydroxyhexanoate units and in which a content of the 3-hydroxyhexanoate units is 24 mol % or more.

Preferably, a proportion of the copolymer (A) is 30 wt % or more and a proportion of the copolymer (B) is 70 wt % or less in a total amount of the copolymers (A) and (B).

Preferably, the resin film further contains a copolymer (C) which is a copolymer of 3-hydroxybutyrate units and 3-hydroxyhexanoate units and in which a content of the 3-hydroxyhexanoate units is from 1 to 7 mol %.

Preferably, a proportion of the copolymer (C) is from 1 to 40 wt % in a total amount of the copolymers (A), (B), and (C).

Preferably, the resin film further contains 1 to 15 parts by weight of a plasticizer per 100 parts by weight of a total amount of poly(3-hydroxyalkanoate) resins. Preferably, the plasticizer is at least one selected from the group consisting of a glycerin ester compound, a dibasic ester compound, an adipic ester compound, a polyether ester compound, and an isosorbide ester compound.

Preferably, a thickness of the resin film is from 10 to 100 μm.

Preferably, a friction coefficient of the resin film is 0.75 or less.

Preferably, a chloroform-insoluble matter content of the resin film is more than 0 wt % and 5 wt % or less.

Preferably, the resin film is an article produced by inflation molding.

The present invention further relates to a bag, glove, or banding material including the resin film.

ADVANTAGEOUS EFFECTS OF INVENTION

The present invention can provide a resin film containing a poly(3-hydroxyalkanoate) resin component, the resin film having good mechanical properties and high blocking resistance and being producible with high productivity. The resin film, which has good mechanical properties, is suitable for use as a banding material such as a banding film. The resin film, which has high blocking resistance, can exhibit good openability and is suitable for use as a bag or glove.

DESCRIPTION OF EMBODIMENTS

Hereinafter, embodiments of the present invention will be described. The present invention is not limited to the embodiments described below.

An embodiment relates to a resin film containing a reaction product of a poly(3-hydroxyalkanoate) resin component and an organic peroxide.

(Poly(3-hydroxyalkanoate) Resin Component)

The poly(3-hydroxyalkanoate) resin component is a mixture of at least two copolymers each of which is a copolymer of 3-hydroxybutyrate units and 3-hydroxyhexanoate units. Specifically, the poly(3-hydroxyalkanoate) resin component includes: a copolymer (A) which is a copolymer of 3-hydroxybutyrate units and 3-hydroxyhexanoate units and in which the content of the 3-hydroxyhexanoate units is from 1 to 6 mol %; and a copolymer (B) which is a copolymer of 3-hydroxybutyrate units and 3-hydroxyhexanoate units and in which the content of the 3-hydroxyhexanoate units is 24 mol % or more.

The copolymer (A) is a resin having higher crystallinity than the copolymer (B). The content of the 3-hydroxybutyrate units in the copolymer (A) is preferably higher than the average content of 3-hydroxybutyrate units in total monomer units constituting the poly(3-hydroxyalkanoate) resin component. The content of the 3-hydroxyhexanoate units in the copolymer (A) is from 1 to 6 mol %, preferably from 1 to 5 mol %, and more preferably from 2 to 4 mol %.

The weight-average molecular weight of the copolymer (A) is preferably from $20\times10^4$ to $100\times10^4$, more preferably from $22\times10^4$ to $80\times10^4$, and even more preferably from $25\times10^4$ to $60\times10^4$ in order to ensure both the mechanical properties of the resin film and the resin film productivity.

The copolymer (B) is a resin having lower crystallinity than the copolymer (A). The content of the 3-hydroxybutyrate units in the copolymer (B) is preferably lower than the average content of 3-hydroxybutyrate units in total monomer units constituting the poly(3-hydroxyalkanoate) resin component. The content of the 3-hydroxyhexanoate units in the copolymer (B) is from 24 to 99 mol %, preferably from 24 to 50 mol %, more preferably 25 to 35 mol %, and particularly preferably from 26 to 30 mol %.

The weight-average molecular weight of the copolymer (B) is preferably from $20\times10^4$ to $250\times10^4$, more preferably from $25\times10^4$ to $230\times10^4$, and even more preferably from $30\times10^4$ to $200\times10^4$ in order to ensure both the mechanical properties of the resin film and the resin film productivity.

The proportion of each of the copolymers (A) and (B) to the total amount of the two copolymers is not limited to a particular range. Preferably, the proportion of the copolymer (A) is from 30 to 90 wt %, and the proportion of the copolymer (B) is from 10 to 70 wt %, in order to ensure both the mechanical properties of the resin film and the resin film productivity. More preferably, the proportion of the copolymer (A) is from 35 to 70 wt %, and the proportion of the copolymer (B) is from 30 to 65 wt %. Even more preferably, the proportion of the copolymer (A) is from 35 to 50 wt %, and the proportion of the copolymer (B) is from 50 to 65 wt %.

An average content ratio between 3-hydroxybutyrate units and 3-hydroxyhexanoate units in total monomer units constituting the poly(3-hydroxyalkanoate) resin component including the copolymers (A) and (B) (3-hydroxybutyrate units/3-hydroxyhexanoate units) is preferably from 93/7 to 80/20 (mol %/mol %), more preferably from 92/8 to 81/19 (mol %/mol %), even more preferably from 90/10 to 82/18 (mol %/mol %), still even more preferably from 88/12 to 82/18 (mol %/mol %), and particularly preferably from 86/14 to 82/18 (mol %/mol %), in order to ensure both the mechanical properties of the resin film and the resin film productivity.

The average content ratio between different monomer units in the copolymer (A), the copolymer (B), or total monomer units constituting the poly(3-hydroxyalkanoate) resin component can be determined by a method known to those skilled in the art, such as by a method described in paragraph [0047] of WO 2013/147139. The "average content ratio" refers to an average molar ratio. The "average content ratio between different monomer units in total monomer units constituting the poly(3-hydroxyalkanoate) resin component" refers to a molar ratio between different monomer units in total monomer units contained in the total poly(3-hydroxyalkanoate) resin component including the copolymers (A) and (B).

The weight-average molecular weight of the total poly(3-hydroxyalkanoate) resin component is not limited to a particular range, but is preferably from $20\times10^4$ to $200\times10^4$, more preferably from $25\times10^4$ to $150\times10^4$, and even more preferably from $30\times10^4$ to $100\times10^4$, in order to ensure both the mechanical properties of the resin film and the resin film productivity.

The weight-average molecular weight of the copolymer (A), copolymer (B), or poly(3-hydroxyalkanoate) resin component can be measured as a polystyrene-equivalent molecular weight by gel permeation chromatography (HPLC GPC system manufactured by Shimadzu Corporation) using a chloroform solution of the copolymer or resin component. The column used in the gel permeation chromatography may be any column suitable for weight-average molecular weight measurement.

The method for producing the copolymer (A) or (B) is not limited to a particular technique, and may be a chemical synthesis production method or a microbial production method. A microbial production method is more preferred. The microbial production method used can be any known method. Known examples of bacteria that produce a copolymer (P3HB3HH) of 3-hydroxybutyrate units and 3-hydroxyhexanoate units include *Aeromonas caviae*. In particular, in order to increase the P3HB3HH productivity, *Alcaligenes eutrophus* AC32 (FERM BP-6038; see T. Fukui, Y. Doi, J. Bacteria, 179, pp. 4821-4830 (1997)) having a P3HA synthase gene introduced is more preferred. Such a microorganism is cultured under suitable conditions to allow the microorganism to accumulate P3HB3HH in its cells, and the microbial cells accumulating P3HB3HH are used. Instead of the above microorganism, a genetically modified microorganism having any suitable poly(3-hydroxyalkanoate) resin synthesis-related gene introduced may be used depending on the poly(3-hydroxyalkanoate) resin to be produced. The culture conditions including the type of the substrate may be optimized depending on the poly(3-hydroxyalkanoate) resin to be produced.

The method for obtaining a blend of the copolymers (A) and (B) is not limited to a particular technique. The blend may be obtained directly by microbial production or chemical synthesis. Alternatively, the blend may be obtained by producing the copolymers (A) and (B) individually and melting and kneading the copolymers (A) and (B) using an extruder, a kneader, a Banbury mixer, or a roll-mill or may be obtained by dissolving and mixing the copolymers (A) and (B) in a solvent and drying the resulting mixture.

(Organic Peroxide)

Examples of the organic peroxide to be reacted with the poly(3-hydroxyalkanoate) resin component include, but are not limited to, diisobutyl peroxide, cumyl peroxyneodecanoate, di-n-propyl peroxydicarbonate, diisopropyl peroxydicarbonate, di-sec-butyl peroxydicarbonate, 1,1,3,3-tetramethylbutyl peroxyneodecanoate, bis(4-t-butylcyclohexyl) peroxydicarbonate, bis(2-ethylhexyl) peroxydicarbonate, t-hexyl peroxyneodecanoate, t-butyl peroxyneodecanoate, t-butyl peroxyneoheptanoate, t-hexyl peroxypivalate, t-butyl peroxypivalate, di(3,5,5-trimethylhexanoyl) peroxide, dilauroyl peroxide, 1,1,3,3-tetramethylbutyl peroxy-2-ethylhexanoate, disuccinic acid peroxide, 2,5-dimethyl-2,5-bis(2-ethylhexanoylperoxy)hexane, t-hexyl peroxy-2-ethylhexanoate, di(4-methylbenzoyl) peroxide, dibenzoyl peroxide, t-butyl peroxy 2-ethylhexyl carbonate, t-butyl peroxy isopropyl carbonate, 1,6-bis(t-butylperoxycarbonyloxy)hexane, t-butyl peroxy-3,5,5-trimethylhexanoate, t-butyl peroxyacetate, t-butyl peroxybenzoate, t-amyl peroxy-3,5,5-trimethylhexanoate, 2,2-bis(4,4-di-t-butylperoxycyclohexyl)propane, and 2,2-di-t-butylperoxybutane. Among these, dibenzoyl peroxide, t-butyl peroxy 2-ethylhexyl carbonate, and t-butyl peroxy isopropyl carbonate are preferred. One organic peroxide may be used alone, or two or more organic peroxides may be used in combination.

The organic peroxide can be used in various forms such as a solid and a liquid. The organic peroxide may be in the form of a liquid diluted with a diluent. An organic peroxide mixable with the poly(3-hydroxyalkanoate) resin component (in particular, an organic peroxide that is liquid at room temperature (25° C.)) is preferred because such an organic peroxide can be uniformly dispersed in the poly(3-hydroxyalkanoate) resin component to prevent a local modification reaction.

The amount of the organic peroxide used is preferably from 0.01 to 0.5 parts by weight, more preferably from 0.05 to 0.4 parts by weight, and even more preferably from 0.1 to 0.3 parts by weight per 100 parts by weight of the poly(3-hydroxyalkanoate) resin component in order to improve the resin film productivity and the blocking resistance of the resin film while ensuring the mechanical properties of the resin film.

The resin film according to the present embodiment contains at least a reaction product of the poly(3-hydroxyalkanoate) resin component and the organic peroxide. The reaction product is one in which the poly(3-hydroxyalkanoate) resin component has a cross-linked structure resulting from a reaction with the organic peroxide. The introduction of the cross-linked structure into the poly(3-hydroxyalkanoate) resin component can improve the resin film productivity (in particular, productivity in inflation molding) and the blocking resistance of the resin film. The resin film according to the present embodiment may contain an organic peroxide-derived component (such as a product of decomposition of the organic peroxide or a compound derived from the product of decomposition) as a result of the reaction.

The reaction product is preferably obtained by introducing the poly(3-hydroxyalkanoate) resin component and the organic peroxide into an extruder and melting and kneading them in the extruder. This allows for uniform cross-linking of the poly(3-hydroxyalkanoate) resin component. In the melting and kneading, other components as described later, such as a nucleating agent, a lubricant, and an organic or inorganic filler may be introduced into the extruder in addition to the poly(3-hydroxyalkanoate) resin component and the organic peroxide.

In the melting and kneading, the poly(3-hydroxyalkanoate) resin component or the copolymers (A) and (B) and the organic peroxide may be individually introduced into the extruder, or these components may be mixed and then the mixture may be introduced into the extruder.

The melting and kneading can be carried out according to a known or conventional method. For example, the melting and kneading can be carried out using an extruder (single-screw or twin-screw extruder) or a kneader. The conditions of the melting and kneading are not limited to particular details and can be set as appropriate. However, the resin temperature and the residence time are preferably set such that the reaction with the organic peroxide can be completed during the melting and kneading. Specifically, in the melting and kneading, the resin temperature as measured by a thermometer at the die is preferably from 155 to 175° C. In the melting and kneading, the residence time in the extruder is preferably from 60 to 300 seconds.

(Copolymer (C))

The resin film according to the present embodiment may further contain, in addition to the reaction product of the poly(3-hydroxyalkanoate) resin component and the organic peroxide, a copolymer (C) which is a copolymer of 3-hydroxybutyrate units and 3-hydroxyhexanoate units and in which the content of the 3-hydroxyhexanoate units is from 1 to 7 mol %.

In the case where the copolymer (C) is different from the copolymer (A), the copolymers (A) and (B) may be reacted with the organic peroxide, and then the copolymer (C) may be mixed with the reaction product. Alternatively, the copolymers (A), (B), and (C) may be mixed, and then the mixture may be reacted with the organic peroxide. In terms of productivity and properties improvement, it is preferable to mix the copolymer (C) with the reaction product of the copolymers (A) and (B) with the organic peroxide.

In the case of mixing the copolymer (C) with the reaction product of the copolymers (A) and (B) with the organic peroxide, the copolymer (C) remains substantially unreacted with the organic peroxide and does not contain any cross-linked structure formed from a reaction with the organic peroxide, regardless of whether the copolymer (C) is the same as or different from the copolymer (A). Adding the copolymer (C) to the reaction product leads to an increase in the resin film productivity and an improvement in the mechanical properties of the resin film The content of the 3-hydroxyhexanoate units in the copolymer (C) is from 1 to 7 mol %, preferably from 2 to 6 mol %, more preferably from 3 to 6 mol %, and even more preferably from 4 to 6 mol %.

The weight-average molecular weight of the copolymer (C) is preferably from $20\times10^4$ to $100\times10^4$, more preferably from $22\times10^4$ to $80\times10^4$, and even more preferably from $25\times10^4$ to $60\times10^4$ in order to ensure both the mechanical properties of the resin film and the resin film productivity.

The amount of the copolymer (C) is not limited to a particular range. In order to ensure both the resin film productivity and the mechanical properties of the resin film, the proportion of the copolymer (C) to the total amount of the copolymers (A), (B), and (C) is preferably from 1 to 40 wt %, more preferably from 2 to 30 wt %, and even more preferably from 3 to 20 wt %.

(Additional Resin)

The resin film according to the present embodiment may contain an additional resin in addition to the poly(3-hydroxyalkanoate) resins so long as the additional resin does not impair the effect of the present invention. Examples of the additional resin include: aliphatic polyester resins such as polybutylene succinate adipate, polybutylene succinate, polycaprolactone, and polylactic acid; and aliphatic-aromatic polyester resins such as polybutylene adipate terephthalate, polybutylene sebacate terephthalate, and polybutylene azelate terephthalate. The resin film may contain one additional resin or two or more additional resins.

The amount of the additional resin is not limited to a particular range, but is preferably 30 parts by weight or less, more preferably 20 parts by weight or less, and even more preferably 10 parts by weight or less per 100 parts by weight of the total amount of the poly(3-hydroxyalkanoate) resins. The lower limit of the amount of the additional resin is not limited to a particular value and may be 0 part by weight.

The "total amount of the poly(3-hydroxyalkanoate) resins" refers to the total amount of the copolymers (A) and (B) when the resin film does not contain the copolymer (C), and refers to the total amount of the copolymers (A), (B), and (C) when the resin film contains the copolymer (C). The same applies to the following description.

(Additive)

The resin film according to the present embodiment may contain additional components. For example, the resin film may contain an organic or inorganic filler so long as the filler does not impair the effect of the present invention. The amount of the organic or inorganic filler is not limited to a particular range and can be set as appropriate. One organic or inorganic filler may be used alone, or two or more organic or inorganic fillers may be used in combination.

(Silica)

The resin film according to the present embodiment may contain silica as an inorganic filler.

The silica is not limited to a particular type. In terms of usability, synthetic amorphous silica produced by a dry or wet process is preferred. Either hydrophobized or hydrophilized silica may be used. One type of silica may be used alone, or two or more types of silica may be used in combination.

The silica preferably has an adsorbed water content of 0.5 to 7 wt %. The adsorbed water content can be determined as the percentage of weight loss arising from evaporation at 160° C. and measured by means such as MX-50, an electromagnetic balance manufactured by Kensei Kogyo Co., Ltd. If the adsorbed water content is above 7 wt %, the silica particles could be difficult to disperse because of cohesion of the water adsorbed on the surfaces of the silica particles and between the particles and could, during molding, be aggregated into fish eyes which cause appearance defects. If the adsorbed water content is below 0.5 wt %, the slight amount of water remaining between the particles is likely to form bridging liquid membranes which produce strong bonding forces by surface tension, making separation between and dispersion of the particles extremely difficult.

The average primary particle size of the silica is not limited to a particular range and may be in any range so long as the silica provides an improvement in the tearing resistance of the resin film, is not likely to cause appearance defects such as fish eyes in the resin film, and does not significantly reduce the transparency of the resin film. In order to reliably obtain an improving effect on the mechanical properties such as tearing resistance and achieve high transparency, the average primary particle size is preferably from 0.001 to 0.1 μm and particularly preferably from 0.005 to 0.05 μm. The average primary particle size can be determined as an arithmetic mean of the sizes of any 50 or more primary particles observed using a transmission electron microscope (TEM).

The silica content (total silica content) is preferably from 1 to 12 parts by weight per 100 parts by weight of the total amount of the poly(3-hydroxyalkanoate) resins in view of the effect of the addition of the silica and the dispersibility of the silica. The silica content is more preferably 2 parts by weight or more and even more preferably 4 parts by weight or more. The silica content is more preferably 11 parts by weight or less and even more preferably 10 parts by weight or less.

The silica is preferably used in combination with a dispersion aid in order to increase the dispersibility of the silica.

Examples of the dispersion aid include glycerin ester compounds, adipic ester compounds, polyether ester compounds, phthalic ester compounds, isosorbide ester compounds, and polycaprolactone compounds. Among these, the following compounds are preferred because they have high affinity for the resin component and are less likely to cause bleed-out: modified glycerin compounds such as glycerin diacetomonolaurate, glycerin diacetomonocaprylate, and glycerin diacetomonodecanoate; adipic ester compounds such as diethylhexyl adipate, dioctyl adipate, and diisononyl adipate; and polyether ester compounds such as polyethylene glycol dibenzoate, polyethylene glycol dicaprylate, and polyethylene glycol diisostearate. Dispersion aids containing a large amount of biomass-derived component are particularly preferred in order to increase the overall biomass degree of the resulting composition. Examples of such dispersion aids include: acetylated monoglycerides of Riken Vitamin Co., Ltd. such as BIOCIZER and PL series; and Polysorb series of Roquette Freres. One dispersion aid may be used alone, or two or more dispersion aids may be used in combination.

The dispersion aid content (total dispersion aid content) is preferably from 0.1 to 20 parts by weight per 100 parts by weight of the total amount of the poly(3-hydroxyalkanoate) resins in view of the effect of the addition of the dispersion aid and the likelihood of bleed-out of the dispersion aid. The dispersion aid content is more preferably 0.3 parts by weight or more and even more preferably 0.5 parts by weight or more. The dispersion aid content is more preferably 10 parts by weight or less and even more preferably 5 parts by weight or less.

The resin film may contain, in addition to the organic or inorganic filler, one or more other commonly used additives, examples of which include: a colorant such as a pigment or dye; an odor absorber such as activated carbon or zeolite; a flavor such as vanillin or dextrin; an oxidation inhibitor; an antioxidant; a weathering resistance improver; an ultraviolet absorber; a lubricant; a mold release; a water repellent; an antimicrobial; a slidability improver; and other auxiliary additives. The amounts of these additives can also be set as appropriate. The following describes a nucleating agent, lubricant, and plasticizer in detail.

(Nucleating Agent)

The resin film according to the present embodiment may contain a nucleating agent. Examples of the nucleating agent include: polyols such as pentaerythritol, galactitol, and mannitol; and other compounds such as orotic acid, aspartame, cyanuric acid, glycine, zinc phenylphosphonate, and boron nitride. Among these, pentaerythritol is preferred because it is particularly superior in the accelerating effect on crystallization of the poly(3-hydroxyalkanoate) resin component. The amount of the nucleating agent used is not limited to a particular range, but is preferably from 0.1 to 5 parts by weight, more preferably from 0.5 to 3 parts by weight, and even more preferably from 0.7 to 1.5 parts by weight per 100 parts by weight of the total amount of the poly(3-hydroxyalkanoate) resins. One nucleating agent may be used alone, or two or more nucleating agents may be used. The proportions of the nucleating agents used may be adjusted as appropriate depending on the intended purpose.

(Lubricant)

The resin film according to the present embodiment may contain a lubricant. Examples of the lubricant include behenamide, oleamide, erucamide, stearamide, palmitamide, N-stearyl behenamide, N-stearyl erucamide, ethylenebisstearamide, ethylenebisoleamide, ethylenebiserucamide, ethylenebislaurylamide, ethylenebiscapramide, p-phenylenebisstearamide, and a polycondensation product of ethylenediamine, stearic acid, and sebacic acid. Among these, behenamide and erucamide are preferred because they are particularly superior in the lubricating effect on the poly(3-hydroxyalkanoate) resin component. The amount of the lubricant used is not limited to a particular range, but is preferably from 0.01 to 5 parts by weight, more preferably from 0.05 to 3 parts by weight, and even more preferably from 0.1 to 1.5 parts by weight per 100 parts by weight of the total amount of the poly(3-hydroxyalkanoate) resin component. One lubricant may be used alone, or two or more lubricants may be used. The proportions of the lubricants used can be adjusted as appropriate depending on the intended purpose. The resin film according to the present embodiment may be free of any lubricant. Even when being free of any lubricant, the resin film can exhibit high blocking resistance thanks to modification of the poly(3-hydroxyalkanoate) resin component with the organic peroxide.

(Plasticizer)

The resin film according to the present embodiment may contain a plasticizer. Examples of the plasticizer include ester compounds such as glycerin ester compounds, citric ester compounds, sebacic ester compounds, adipic ester compounds, polyether ester compounds, benzoic ester compounds, phthalic ester compounds, isosorbide ester compounds, polycaprolactone compounds, and dibasic ester compounds. Examples of the glycerin ester compounds include glycerin diacetomonolaurate. Examples of the citric ester compounds include tributyl acetylcitrate. Examples of the sebacic ester compounds include dibutyl sebacate. Examples of the dibasic ester compounds include benzyl methyl diethylene glycol adipate.

Among the above plasticizers, the glycerin ester compounds, dibasic ester compounds, adipic ester compounds, polyether ester compounds, and isosorbide ester compounds are particularly superior in the plasticizing effect on the poly(3-hydroxyalkanoate) resin component, and it is preferable to use one of these ester compounds or two or more thereof in combination.

The amount of the plasticizer used is not limited to a particular range, but is preferably from 1 to 15 parts by weight, more preferably from 2 to 13 parts by weight, and even more preferably from 3 to 10 parts by weight per 100 parts by weight of the total amount of the poly(3-hydroxyalkanoate) resins. One plasticizer may be used alone, or two or more plasticizers may be used. The proportions of the plasticizers used can be adjusted as appropriate depending on the intended purpose.

(Thickness of Resin Film)

The thickness of the resin film is not limited to a particular range, but is preferably from 10 to 100 µm, more preferably from 15 to 80 µm, and even more preferably from 20 to 60 µm.

(Friction Coefficient of Resin Film)

The friction coefficient of the resin film is preferably 0.75 or less, more preferably 0.73 or less, and even more preferably 0.7 or less in order to achieve high blocking resistance. The lower limit of the friction coefficient is not limited to a particular value. For example, the friction coefficient may be 0.2 or more or may be 0.4 or more. The friction coefficient can be measured according to a testing method as specified in RS K 7125:1999.

(Chloroform-Insoluble Matter Content)

The resin film typically contains chloroform-insoluble matter since the poly(3-hydroxyalkanoate) resin component has a cross-linked structure. The chloroform-insoluble matter content of the resin film is more than 0 wt %. Specifically, the chloroform-insoluble matter content may be 0.5 wt % or more or may be 1 wt % or more. The chloroform-insoluble matter content of the resin film is preferably 5 wt % or less, more preferably 4 wt % or less, and even more preferably 3 wt % or less in order to avoid printing defects such as a blank spot in printing on the resin film.

The chloroform-insoluble matter content can be evaluated according to the following method. A resin film sample weighing 0.1±0.03 g is added to 10 ml of chloroform and held at 60° C. for 30 minutes. After that, the chloroform solution is filtered through a PTFE filter having a pore size of 0.45 µm, then the filter is dried, and a weight increase of the filter is determined as the weight of insoluble matter. The determined weight is divided by the weight of the resin film sample to calculate the chloroform-insoluble matter content.

(Method for Producing Resin Film)

The resin film according to the present embodiment can be produced by any of various molding methods such as T-die extrusion molding, inflation molding, and calendering. The resin film is preferably produced by inflation molding.

The "inflation molding" refers to a molding method in which an extruder fitted at its end with a cylindrical die is used to extrude a molten resin composition into the shape of a tube and immediately a gas is injected into the tube to inflate the tube into the shape of a balloon and thus form a single-walled or multi-walled tubular film. The inflation molding is not limited to using a particular means and can be carried out, for example, by means of a common inflation molding machine for use in molding a thermoplastic resin into a film. In the case of forming a single-walled film, the "common inflation molding machine" refers to a molding machine in which one single-screw extruder is fitted with one cylindrical die. In the case of forming a multi-walled film, the "common inflation molding machine" refers to a molding machine in which molten resins can be poured into one cylindrical die from a plurality of extruders corresponding respectively to the different types of resins used and in which layers of the resins can be placed on one another in the die. The single-screw extruder may be any single-screw extruder that melts and kneads introduced raw material resins and that discharges the kneaded product at a constant rate while maintaining the kneaded product at a desired temperature. The single-screw extruder is not limited to a particular screw design. A screw including a mixing element is preferred in terms of kneading performance. The cylindrical die is not limited to a particular structure and may be designed as appropriate depending on whether the tubular film to be formed is single-walled or multi-walled. In particular, a spiral mandrel die is preferred because the use of this die reduces the occurrence of welds and is likely to result in a uniform thickness of the film.

The molding temperature in the inflation molding is not limited to a particular range and may be any temperature at which the resins can be properly melted. For example, the molding temperature is preferably from 135 to 200° C. The "molding temperature" refers to a resin temperature during the period from introduction into the extruder to discharge from the die. The resin temperature can be typically measured by a thermometer mounted on the adapter.

The drawing speed in the inflation molding is chosen depending on the thickness and width of the resin film and the resin discharge rate and can be adjusted within a range over which the balloon stability can be ensured. In general, the drawing speed is preferably from 1 to 50 m/min.

In the inflation molding, an air ring that blows air onto the exterior of the balloon can be used to solidify the discharged molten resin and stabilize the balloon. A suitable air blowing structure of the air ring is a slit-type structure including a plurality of annular slits through which air is blown out and chambers which are located between the slits and by which stabilization of the balloon is facilitated.

The inflation molding may be followed by the steps of: collapsing the extruded tube of film into a lay-flat double-layer film by pinch rolls and transferring the lay-flat double-layer film toward a take-up roll; blowing air into the interface between the two layers of the lay-flat film so that the two layers of the lay-flat film can easily be separated from each other after the film is wound on the take-up roll; and cutting the film according to the intended use while transferring the film toward the take-up roll. Examples of the cutting method include: a method consisting of cutting the opposite width edges of the lay-flat tube of film to form two films; and a method consisting of hot-cutting the lay-flat tube of film along its width and heat-sealing the cut portion to form a bag-shaped film. To facilitate the cutting, the step of blowing air into the interface between the two layers of the lay-flat film may be performed immediately before the cutting. A so-called gusseting step may be performed in which the opposite edges of the lay-flat tube of film are folded inward to form gussets. The step of printing on the film surface may be performed after the tube of film is collapsed into a lay-flat film by the pinch rolls and before the lay-flat film is wound on the take-up roll. Before the printing, the film surface may be subjected to a corona treatment to improve the ink adhesion. Examples of the printing method include, but are not limited to, gravure printing and flexographic printing.

The resin film according to the present embodiment has high biodegradability and is thus suitable for use in various fields such as agricultural industry, fishery industry, forestry industry, horticultural industry, medical industry, hygiene industry, food industry, apparel industry, non-apparel industry, packing industry, automotive industry, building material industry, and various other industries. For example, the resin film can be used in various products such as a garbage bag, a checkout bag, a packing bag for vegetables and fruits, a pillow packing bag, a bag for home-delivery service, a mulch film for agriculture, a fumigation sheet for forestry, a glove, a banding material, a root wrapping film for garden plants, a back sheet of a diaper, a sheet for packing, a shopping bag, a draining bag, and a compost bag. The "banding material" refers to a flat, string-shaped or strip-shaped material used to bundle and fix a plurality of articles (e.g., a plurality of boxes or PTP sheets), and examples of the banding material include a flat yarn, a banding tape, and a banding film. In particular, the resin film according to the present embodiment is preferably used as a packing material including a heat-sealed portion (e.g., any of various types of bags).

EXAMPLES

Hereinafter, the present invention will be specifically described using examples. The technical scope of the present invention is not limited by the examples given below.

The following materials were used in Examples and Comparative Examples.

P3HB3HH-1: P3HB3HH (average content ratio 3HB/3HH=97.2/2.8 (mol %/mol %), weight-average molecular weight=$66 \times 10^4$ g/mol)

This resin was produced according to a method as described in Example 2 of WO 2019/142845.

P3HB3HH-2: P3HB3HH (average content ratio 3HB/3HH=71.8/28.2 (mol %/mol %), weight-average molecular weight=$66 \times 10^4$ g/mol)

This resin was produced according to a method as described in Example 9 of WO 2019/142845.

P3HB3HH-3: X131A (Kaneka Biodegradable Polymer PHBH™, average content ratio 3HB/3HH=94/6 (mol %/mol %), weight-average molecular weight=$60 \times 10^4$ g/mol)

(Organic Peroxide)

PERBUTYL I manufactured by NOF Corporation (t-butyl peroxy isopropyl carbonate, one-minute half-life temperature=159° C.)

(Nucleating Agent)

Pentaerythritol (Neulizer P, manufactured by Mitsubishi Chemical Corporation)

(Plasticizer)

Glycerin diacetomonolaurate (RIKEMAL PL-012, manufactured by Riken Vitamin Co., Ltd.)

(Lubricants)

Erucamide, Behenamide

The following evaluations were conducted in Examples and Comparative Examples.

(Productivity of Inflation Molding)

In film production by inflation molding, the maximum drawing speed was determined at which the balloon was evaluated to be stable (the balloon stability was rated as "Good") in the balloon stability evaluation described below while the thickness of the film was maintained at about 30 μm.

(Balloon Stability Evaluation)

Good: The variation in lay-flat width was less than 20 mm over a length of 20 m of the resulting film.

Poor: The variation in lay-flat width was equal to or more than 20 mm over a length of 20 m of the resulting film, or a film was not able to be obtained due to breakage or significant deformation of the balloon.

The "lay-flat width" refers to the width of a lay-flat double-layer film into which the balloon-shaped film extruded from the die was collapsed by passage between cooling rolls. A greater variation in lay-flat width means a greater variation in thickness and hence a greater difficulty in maintaining the cylindrical shape (namely, a greater difficulty in forming the balloon stably).

(Evaluation of Blocking Resistance)

A strip-shaped sample with a width of 5 cm and a length of 15 cm was cut out from the double-layer film wound after inflation molding. The sample was held and rubbed between a thumb and an index finger, and the blocking resistance was evaluated based on whether the two layers of the film were separable from each other by the rubbing.

Good: Separable
Poor: Inseparable
(Elastic Modulus, Tensile Strength at Break, and Elongation at Break)

A tensile test was carried out according to JIS K 7127: 1999 (Plastics—Determination of tensile properties—) to evaluate the elastic modulus, tensile strength at break, and elongation at break. The shape of the test specimen was Type 5 as specified in the JIS method, and the tensile speed was 100 mm/min
(Tearing Resistance)

The tearing resistance was evaluated according to JIS K 7128-2 (Plastics—Film and sheeting—Determination of tear resistance).
(Friction Coefficient)

The film was evaluated for friction coefficient according to the testing method as specified in JIS K 7125:1999.
(Chloroform-Insoluble Matter Content)

A resin film sample weighing 0.1±0.03 g was added to 10 ml of chloroform and held at 60° C. for 30 minutes. After that, the chloroform solution was filtered through a PTFE filter having a pore size of 0.45 gm, then the filter was dried, and a weight increase of the filter was determined as the weight of insoluble matter. The determined weight was divided by the weight of the resin film sample to calculate the chloroform-insoluble matter content (wt %).

Example 1 Method for Producing Resin Film

P3HB3HH-1, P3HB3HH-2, the organic peroxide, the nucleating agent, and the lubricants were dry-blended in proportions shown in Table 1, and the blend was melted and kneaded using an intermeshing co-rotating twin-screw extruder (TEM-26ss, manufactured by Toshiba Machine Co., Ltd) at a set temperature of 120 to 170° C. and a screw rotational speed of 100 rpm, and the extruded strand was cut to obtain a melting-kneading product. The melting-kneading product obtained was introduced into an inflation molding machine (manufactured by Hokushin Sangyo Co., Ltd.) including an extruder having a single screw with an L/D ratio of 32 and having connected thereto a die fitted with a cylindrical die slip with a diameter of 100 mm, and thus a film was produced. Table 1 shows the evaluation results of the productivity of the inflation molding and the blocking resistance, elastic modulus, tensile strength at break, elongation at break, tearing resistance, and friction coefficient of the produced film. The evaluations were conducted after the produced film was aged at 25° C. for 1 week.

Example 2

P3HB3HH-1, P3HB3HH-2, the organic peroxide, the nucleating agent, and the lubricants were dry-blended in proportions shown in Table 1, and a melting-kneading product was obtained in the same manner as in Example 1. The obtained melting-kneading product and P3HB3HH-3 (the amount of which is shown in Table 1) were introduced into the inflation molding machine described in Example 1, and thus a film was produced. The evaluation results are shown in Table 1.

Example 3

A film was produced by performing inflation molding in the same manner as in Example 1, except that one of the lubricants, in particular erucamide, was not added. The evaluation results are shown in Table 1.

Example 4

P3HB3HH-1, P3HB3HH-2, the organic peroxide, the plasticizer, the nucleating agent, and the lubricants were dry-blended in proportions shown in Table 1, and a melting-kneading product was obtained in the same manner as in Example 1. The obtained melting-kneading product and P3HB3HH-3 (the amount of which is shown in Table 1) were introduced into the inflation molding machine described in Example 1, and thus a film was produced. The evaluation results are shown in Table 1.

Comparative Example 1

A film was produced by performing inflation molding in the same manner as in Example 1, except that the organic peroxide was not added. The evaluation results are shown in Table 1.

Comparative Example 2

A film was produced by performing inflation molding in the same manner as in Example 2, except that the organic peroxide was not added. The evaluation results are shown in Table 1.

Comparative Example 3

A film was produced by performing inflation molding in the same manner as in Comparative Example 1, except that instead of P3HB3HH-1 and P3HB3HH-2, P3HB3HH-3 was dry-blended with the lubricant. The evaluation results are shown in Table 1.

TABLE 1

| Formulation | | | Example 1 | Example 2 | Example 3 | Example 4 | Comp. Example 1 | Comp. Example 2 | Comp. Example 3 |
|---|---|---|---|---|---|---|---|---|---|
| P3HA resin | P3HB3HH-1 | Parts by weight | 39 | 36 | 39 | 36 | 39 | 36 | |
| | P3HB3HH-2 | | 61 | 54 | 61 | 54 | 61 | 54 | |
| | P3HB3HH-3 | | | 10 | | 10 | | 10 | 100 |
| Organic peroxide | | | 0.15 | 0.11 | 0.15 | 0.135 | | | |
| Plasticizer | | | | | | 4.5 | | | |
| Nucleating agent | | | 1 | 1 | 1 | 0.9 | 1 | 1 | |
| Lubricant | Behenamide | | 0.5 | 0.5 | 0.5 | 0.45 | 0.5 | 0.5 | 0.5 |
| | Erucamide | | 0.5 | 0.5 | | 0.45 | 0.5 | 0.5 | |
| Inflation molding | | Lay-flat width (mm) | 400 | 400 | 400 | 400 | 400 | 400 | 400 |
| | | Productivity | 6 m/min | 12 m/min | 6 m/min | 14 m/min | 5 m/min | 5 m/min | 10 m/min |
| | Blocking resistance | | Good | Good | Good | Good | Poor | Poor | Good |
| | Thickness (μm) | | 33 | 35 | 33 | 30 | 33 | 28 | 30 |

TABLE 1-continued

| Formulation | | Example 1 | Example 2 | Example 3 | Example 4 | Comp. Example 1 | Comp. Example 2 | Comp. Example 3 |
|---|---|---|---|---|---|---|---|---|
| Elastic modulus (MPa) | MD | 500 | 966 | 530 | 496 | 650 | 705 | 2220 |
| | TD | 601 | 822 | 609 | 655 | 609 | 590 | 2286 |
| Tensile strength at break (MPa) | MD | 31 | 32 | 31 | 33 | 28 | 28 | 31 |
| | TD | 31 | 32 | 31 | 25 | 25 | 29 | 35 |
| Elongation at break (%) | MD | 393 | 343 | 385 | 417 | 359 | 280 | 100 |
| | TD | 463 | 351 | 470 | 453 | 361 | 292 | 7 |
| Tearing resistance (N/mm) | MD | 7 | 10 | 7 | 5 | 5 | 50 | 3 |
| | TD | 9 | 15 | 9 | 50 | 6 | 19 | 3 |
| Friction coefficient | | 0.51 | 0.64 | 0.69 | 0.44 | 0.92 | 0.78 | 0.44 |
| Chloroform-insoluble matter content (wt %) | | | | | 3.9 | | | |

Table 1 reveals the following findings. The films of Examples 1 to 3 were superior in terms of productivity and blocking resistance and exhibited good mechanical properties. The film of Example 4, in which the plasticizer was added, was also superior in terms of productivity and blocking resistance.

The films of Comparative Examples 1 and 2, in which the organic peroxide was not used, were inferior in terms of productivity and had poor blocking resistance. The film of Comparative Example 3, in which only one type of PHBH was used and the organic peroxide was not used, was superior in terms of productivity and blocking resistance but had a low elongation at break and a low tearing resistance.

The invention claimed is:

1. A resin film comprising a reaction product of 100 parts by weight of a poly(3-hydroxyalkanoate) resin component and 0.01 to 0.5 parts by weight of an organic peroxide, wherein
    the poly(3-hydroxyalkanoate) resin component comprises:
        a copolymer (A) which is a copolymer of 3-hydroxybutyrate units and 3-hydroxyhexanoate units and in which a content of the 3-hydroxyhexanoate units is from 1 to 6 mol %; and
        a copolymer (B) which is a copolymer of 3-hydroxybutyrate units and 3-hydroxyhexanoate units and in which a content of the 3-hydroxyhexanoate units is 24 mol % or more,
    wherein the resin film further comprises a copolymer (C) which is a copolymer of 3-hydroxybutyrate units and 3-hydroxyhexanoate units and in which a content of the 3-hydroxyhexanoate units is from 1 to 7 mol %, wherein the copolymer (C) is not reacted with the organic peroxide.

2. The resin film according to claim 1, wherein a proportion of the copolymer (A) is at least 30 wt % and a proportion of the copolymer (B) is 70 wt % or less in a total amount of the copolymers (A) and (B).

3. The resin film according to claim 1, wherein a proportion of the copolymer (C) is from 1 to 40 wt % in a total amount of the copolymers (A), (B), and (C).

4. The resin film according to claim 1, further comprising from 1 to 15 parts by weight of a plasticizer per 100 parts by weight of a total amount of poly(3-hydroxyalkanoate) resins.

5. The resin film according to claim 4, wherein the plasticizer is at least one selected from the group consisting of a glycerin ester compound, a dibasic ester compound, an adipic ester compound, a polyether ester compound, and an isosorbide ester compound.

6. The resin film according to claim 1, wherein a thickness of the resin film is from 10 to 100 μm.

7. The resin film according to claim 1, wherein a friction coefficient of the resin film is 0.75 or less.

8. The resin film according to claim 1, wherein a chloroform-insoluble matter content of the resin film is more than 0 wt % to 5 wt %.

9. The resin film according to claim 1, wherein the resin film is an article produced by inflation molding.

10. The resin film according to claim 1, wherein the organic peroxide is at least one selected form the group consisting of dibenzoyl peroxide, t-butyl peroxy 2-ethylhexyl carbonate, and t-butyl peroxy isopropyl carbonate.

11. The resin film according to claim 1, comprising a reaction product of 100 parts by weight of the poly(3-hydroxyalkanoate) resin component and from 0.05 to 0.4 parts by weight of the organic peroxide.

12. The resin film according to claim 1, comprising a reaction product of 100 parts by weight of the poly (3-hydroxyalkanoate) resin component and from 0.1 to 0.3 parts by weight of the organic peroxide.

13. The resin film according to claim 1, wherein a proportion of the copolymer (A) is from 30 to 90 wt % and a proportion of the copolymer (B) is from 10 to 70 wt % in a total amount of the copolymers (A) and (B).

14. The resin film according to claim 1, wherein a proportion of the copolymer (A) is from 35 to 50 wt % and a proportion of the copolymer (B) is from 50 to 65 wt % in a total amount of the copolymers (A) and (B).

15. The resin film according to claim 1, wherein a proportion of the copolymer (C) is from 3 to 20 wt % in a total amount of the copolymers (A), (B), and (C).

16. The resin film according to claim 1, wherein the copolymer (C) is different from the copolymer (A).

17. The resin film according to claim 1, wherein a thickness of the resin film is from 20 to 60 μm.

18. A bag, glove, or banding material comprising the resin film according to claim 1.

* * * * *